US005702139A

United States Patent [19]

Buck

[11] Patent Number: 5,702,139

[45] Date of Patent: Dec. 30, 1997

[54] BACK-UP POWER TONGS

[76] Inventor: David A. Buck, 1348 Sawmill Hwy., Breaux Bridge, La. 70517

[21] Appl. No.: 728,773

[22] Filed: Oct. 11, 1996

Related U.S. Application Data

[63] Continuation-in-part of Ser. No. 542,780, Oct. 13, 1995, Pat. No. 5,671,961.

[51] Int. Cl.[6] .............................. B23P 19/04; B25J 15/00

[52] U.S. Cl. ............................ 294/88; 294/106; 81/57.33

[58] Field of Search ............................ 294/86.1, 88, 106, 294/115; 81/57.15, 57.16, 57.18, 57.19, 57.2, 57.21, 57.33, 57.34, 57.35

[56] References Cited

U.S. PATENT DOCUMENTS

| | | | |
|---|---|---|---|
| 2,544,639 | 3/1951 | Calhoun | 255/35 |
| 3,180,186 | 4/1965 | Catland | 81/57 |
| 4,030,746 | 6/1977 | Langowski | 294/88 |
| 4,304,433 | 12/1981 | Langowski | 294/88 |
| 4,381,169 | 4/1983 | Muhr et al. | 414/753 |
| 4,426,869 | 1/1984 | Farmer et al. | 81/57.14 |
| 4,441,749 | 4/1984 | Blaschke et al. | 294/88 |
| 4,546,681 | 10/1985 | Owsen | 82/38 |
| 4,647,099 | 3/1987 | Berry et al. | 294/88 |
| 4,649,777 | 3/1987 | Buck | 81/57.19 |
| 4,759,239 | 7/1988 | Hamilton et al. | 81/57.34 |
| 4,811,635 | 3/1989 | Falgout, Sr. | 81/57.33 |
| 5,417,464 | 5/1995 | Seaberg et al. | 294/88 |
| 5,542,318 | 8/1996 | Wesch, Jr. | 81/57.33 |

*Primary Examiner*—Dean Kramer
*Attorney, Agent, or Firm*—Roy, Kiesel & Tucker

[57] ABSTRACT

The present invention provides back-up power tongs for holding a tubular member against rotation of a connected tubular member. The back-up power tongs comprise a body with a front section for receiving the tubular member and a plurality of jaw members for engaging the tubular member. The jaw members are positioned to form a substantially closed perimeter around the tubular member and at least one of the jaw members is a pivotal jaw, moving in a pivotal path to engage the tubular member. An alternate embodiment provides two pivoting jaws and a locking mechanism attached to the end of the pivoting jaws such that the pivoting jaws can be securely interlocked. The improved back-up tongs should not require that the tong body to virtually enclose the pipe and thus will allow the improved back-up tongs to be considerably smaller. The smaller size of the tongs will allow more versatile use since the tongs can operate in areas with less clearance than prior art tongs. The improved back-up tongs should also be less costly as they will require a considerably smaller amount of material to construct. Additionally, the improved back-up power tongs will be adaptable to many uses other than breaking pipe in conjunction with conventional power tongs. The present invention also may have application as a gripping device positioned on cranes or other lifting apparatus.

20 Claims, 7 Drawing Sheets

BACK-UP POWER TONGS

This is a continuation-in-part of application Ser. No. 08/542,780 filed on Oct. 13, 1995 now U.S. Pat. No. 5,671,961 which is hereby incorporated by reference into this application.

BACKGROUND OF INVENTION

This invention relates generally to devices which grip tubular members, such as drill pipe. More particularly, this invention relates to devices which hold one segment of pipe immobile while another segment of pipe is connected or disconnected. These latter devices are often referred to as back-up power tongs.

Pipe tongs are often employed in the oil and gas industry, particularly to break apart or tighten together threaded pipe connections. It is generally required that one set of pipe tongs grip and rotate one section of pipe and one set of pipe tongs grip and hold stationary the other section of pipe. Modem drilling operations usually employ powered pipe tongs or power tongs. The first set of tongs rotating the pipe are typically referred to simply as power tongs. The second set of tongs holding the pipe stationary are typically referred to as the "back-up" power tongs.

Power tongs generally comprise a body with a passage leading to a central opening such that a section of pipe may be inserted through the passage and positioned in the central opening. Jaw members that are positioned inside the body of the power tongs will selectively move toward and away from the central opening in order to engage and disengage the pipe. The jaw members will usually include dies which will provide the surface actually contacting the pipe. These dies typically have a rough surface or "teeth" to insure the pipe is firmly gripped between the jaws.

Power tongs require a means of maintaining the jaws against the pipe without slippage while considerable rotational forces are applied to the pipe. To accomplish this, the prior art has generally relied on cam surfaces or pistons as a means for closing the jaws against the pipe. It is also preferable to have the jaws contact the pipe around as much of the pipe's circumference as possible. Therefore the closing means is typically positioned around the central opening to grip the pipe from all sides.

U.S. Pat. No 4,649,777 to Buck illustrates three hydraulic cylinders positioned around the central opening. U.S. Pat. No. 4,290,304 shows the positioning era cam surface about the central opening which allows the jaws to tighten as they rotate against the cam surface. While supplying sufficient gripping force, these arrangements result in the closing means being positioned on all sides of the central opening and the power tong body having to virtually enclose the pipe. This inherently leads to the body of the power tong being large and bulky. Incidental to the size of these back-up power tongs is the associated costs from having to use a comparatively large amount of materials in constructing the tongs. Additionally, the greater the size of the tongs, the more limited their use since many applications may require the power tongs operate in areas where there is not sufficient side clearance.

What is needed in the art is improved back-up power tongs which will overcome these disadvantages. The improved back-up tongs should not require that the tong body to virtually enclose the pipe and thus will allow the improved back-up tongs to be considerably smaller. The smaller size of the tongs will allow more versatile use since the tongs can operate in areas with less clearance than prior art tongs. The improved back-up tongs should also be less costly as they will require a considerably smaller amount of material to construct.

Additionally, the improved back-up power tongs will be adaptable to many uses other than breaking pipe in conjunction with conventional power tongs. The present invention also may have application as a gripping device positioned on cranes or other lifting means.

SUMMARY OF INVENTION

Therefore, it is an object of this invention to provide back-up power tongs that are less expensive to build and maintain than hereto known in the art.

It is another object of this invention to provide back-up power tongs that are smaller and can therefore operate in smaller confines than hereto known in the art.

It is still another object of this invention to provide hack-up power tongs that may grip a substantial circumferential portion of a pipe without the body of the back-up tongs having to enclose the pipe.

It is also an object to provide a locking mechanism such that the jaws of the tongs are securely interlocked when the tongs close.

Accordingly the present invention provides back-up power tongs for holding a tubular member against rotation of a connected tubular member. The back-up power tongs comprise a body with a front section for receiving the tubular member and a plurality of jaw members for engaging the tubular member. The jaw members are positioned to form a substantially closed perimeter around the tubular member and at least one of the jaw members is a pivotal jaw, moving in a pivotal path to engage the tubular member.

An alternate embodiment provides two pivoting jaws and a locking mechanism attached to the end of the pivoting jaws such that the pivoting jaws can be securely interlocked.

DETAILED DESCRIPTION OF PREFERRED EMBODIMENTS

Figure 1:
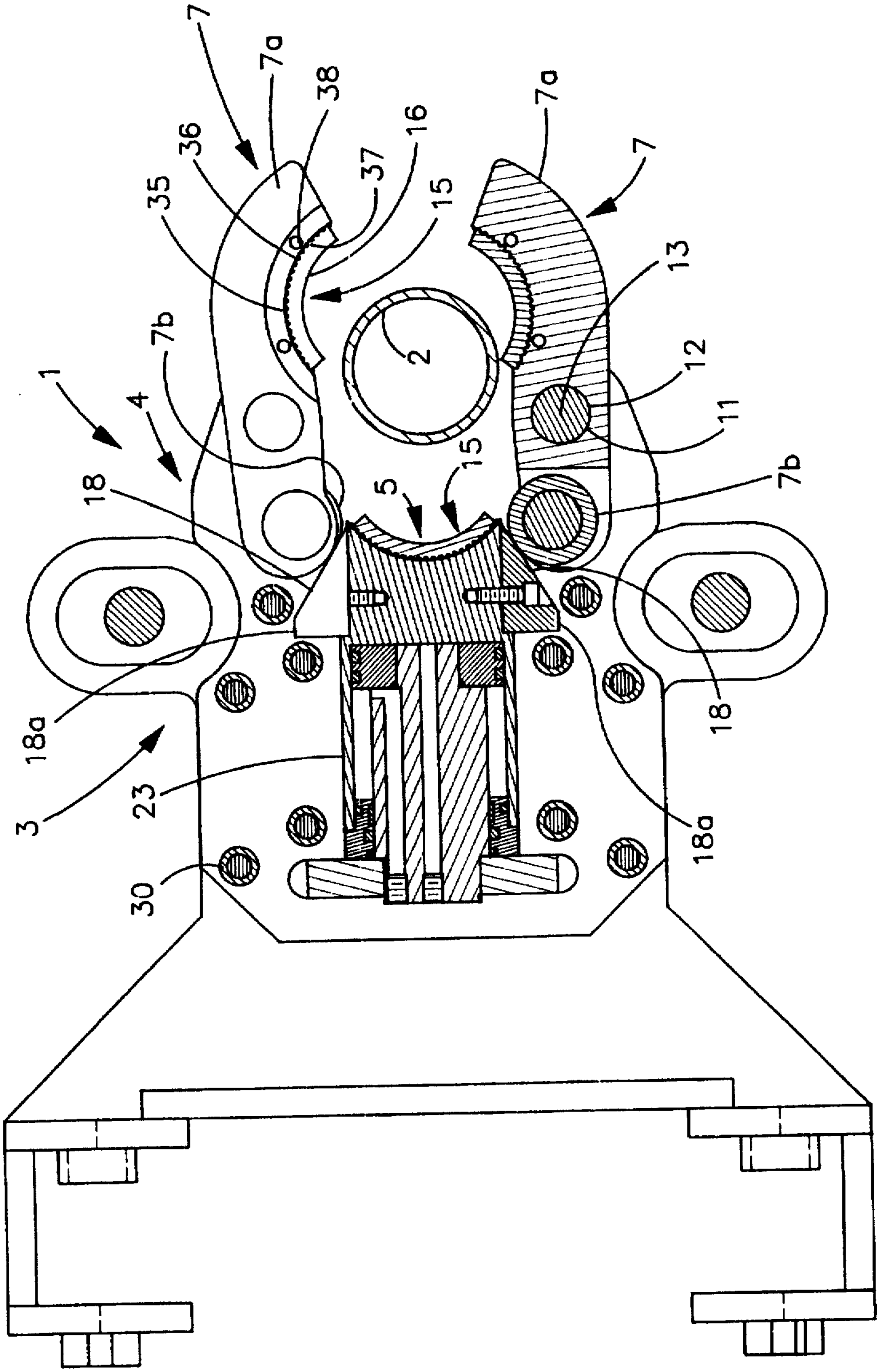
FIG. 1 is a top view of the back-up power tongs with the top plate removed and the pivoting jaws in the fully open position.

In a preferred embodiment illustrated in FIG. 1, the basic components of improved back-up power tongs 1 comprise a tong body 3, an axial jaw member 5 and two pivoting jaw members 7. Tong body 3 also includes top plate 9 and a bottom plate 10. While top plate 9 has been removed from FIGS. 1–3 in order to show the internal components of back-up tongs 1, top plate 9 and a bottom plate 10 may be seen from the side in FIG. 4. Bolts 30 will be used to secure top plate 9 and a bottom plate 10 to body 3.

Figure 3:
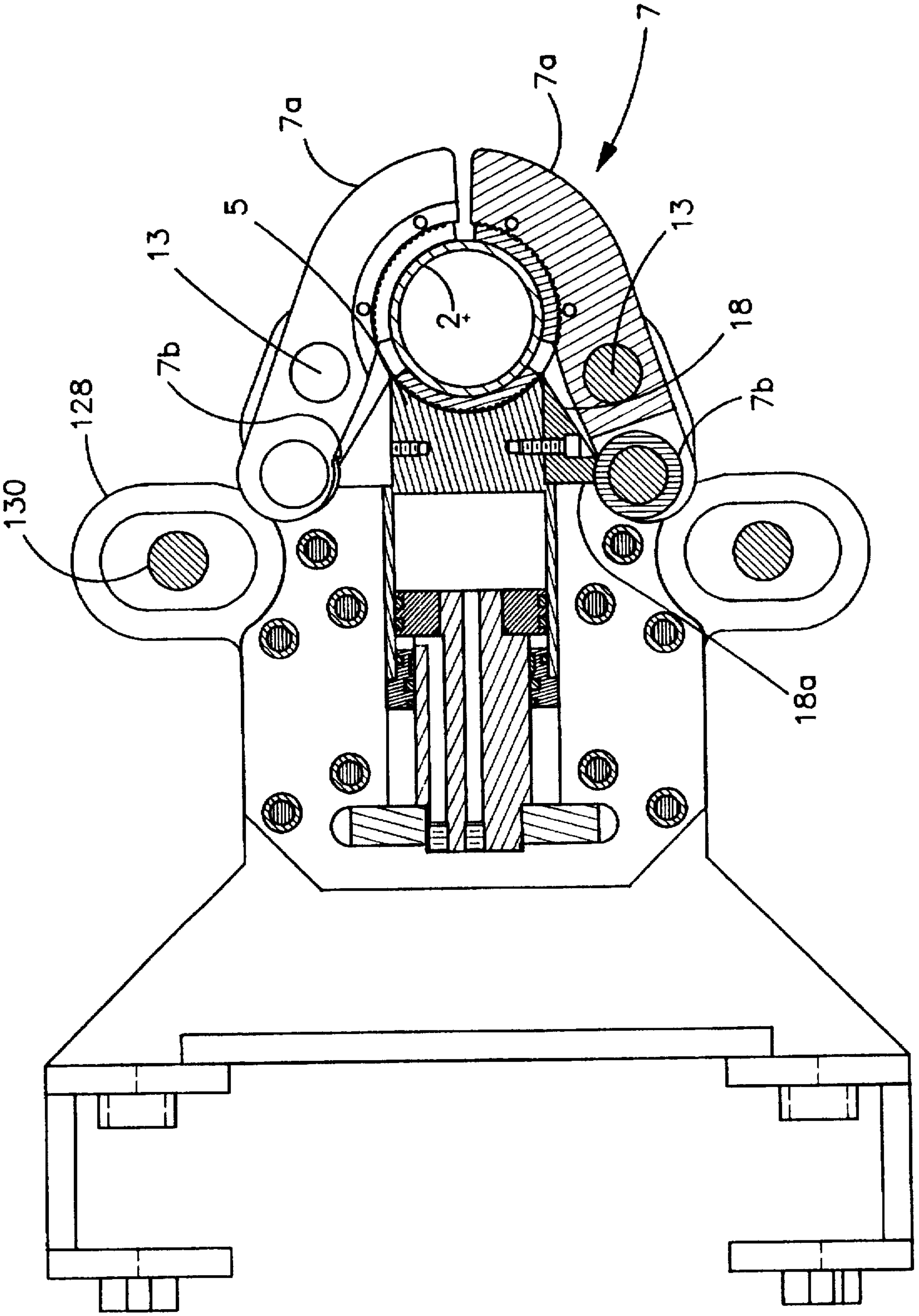
FIG. 3 is a top view of the back-up power tongs with the top plate removed and the pivoting jaws in a fully closed position.
Figure 4:
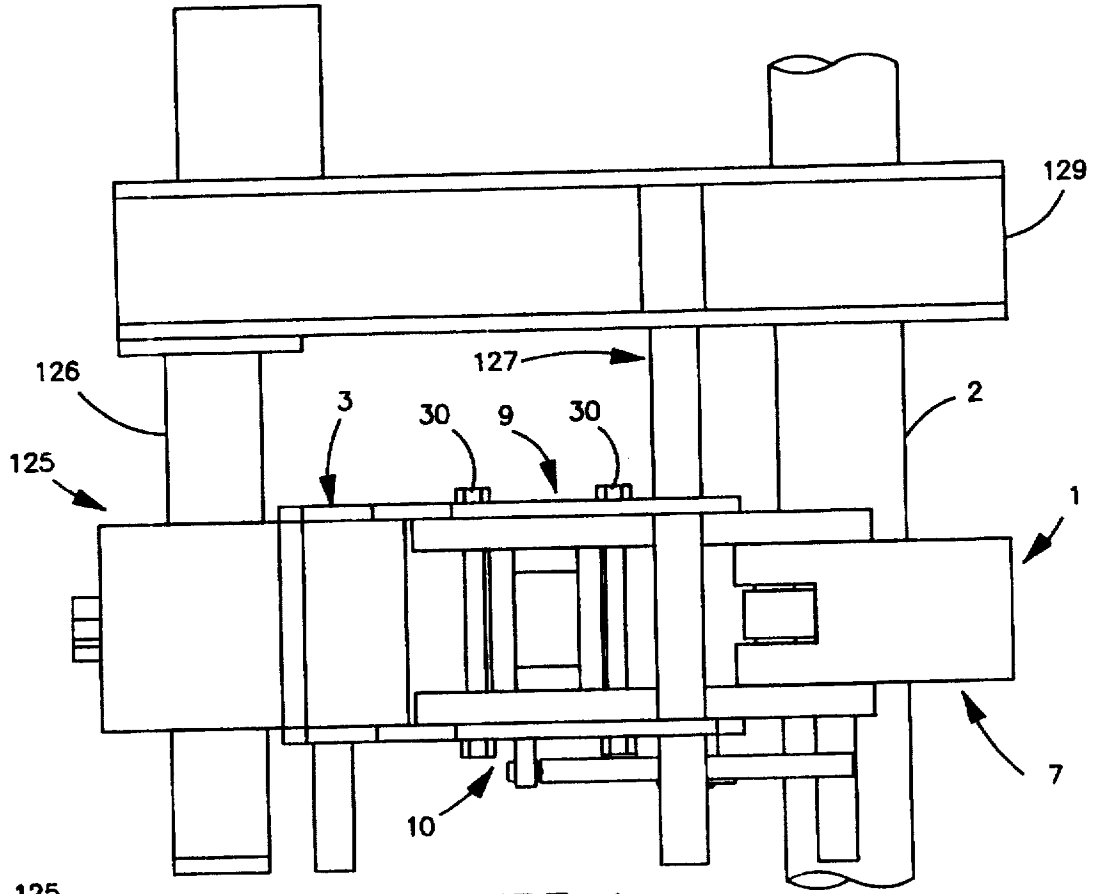
FIG. 4 is a side view of the back-up power tongs illustrating the back-up power tongs use in conjunction with conventional power tongs.

FIG. 4 also illustrates how back-up tongs 1 will typically be employed in conjunction with conventional power tongs 129. Both the conventional power tongs 129 and the back-up power tongs 1 will be connected to a common support 126. Back-up power tongs 1 are connected to common support 126 via frame member 125 located on the rear portion of tong body 3. Additionally, legs 127 will extend between conventional power tongs 129 and the back-up power tongs 1 in order to maintain alignment of the tongs. Legs 127 will engage tong body 3 by way of leg flanges 128 and leg apertures 130 (best seen in FIG. 3).

Figure 2:
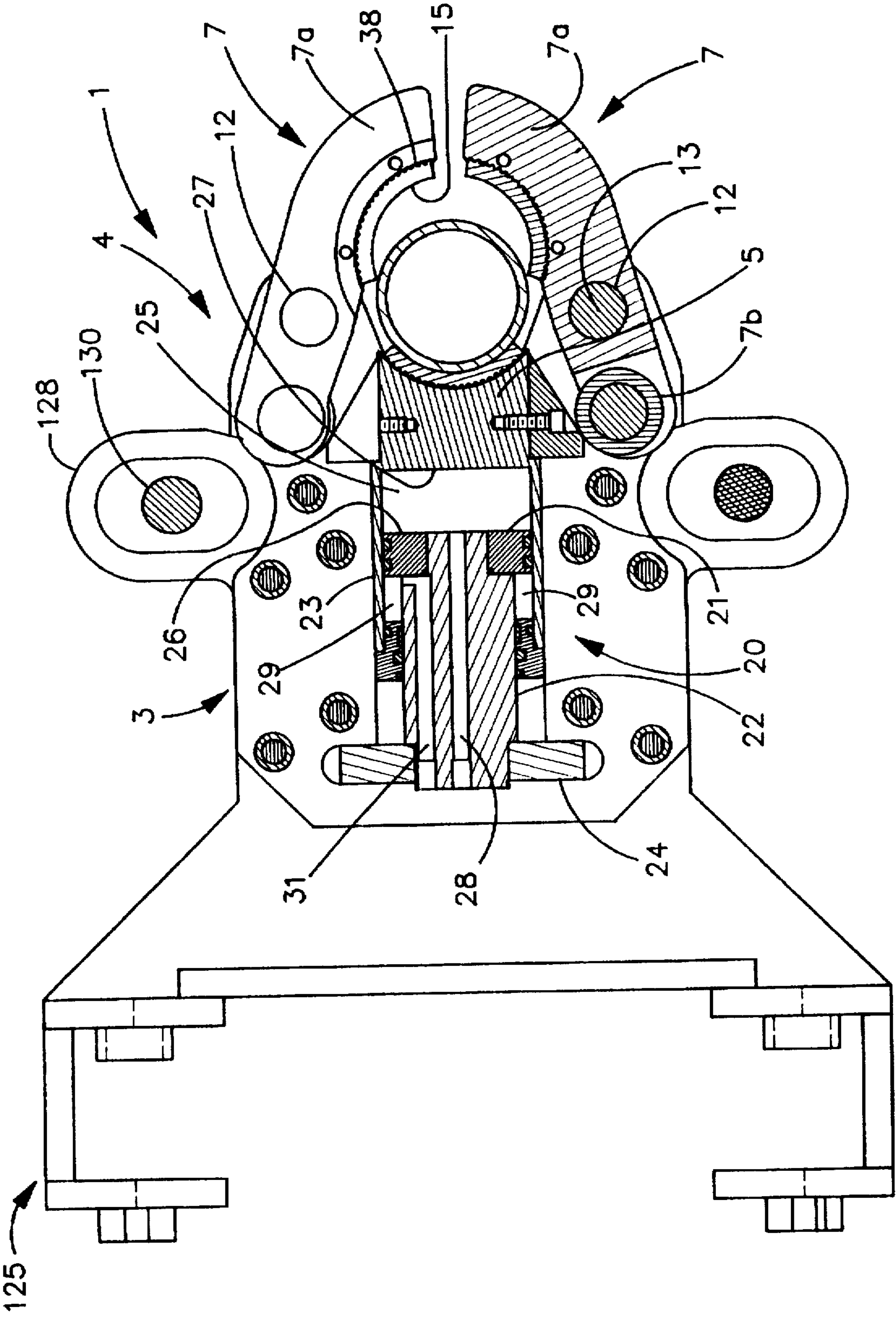
FIG. 2 is a top view of the back-up power tongs with the top plate removed and the pivoting jaws in a partially closed position.

Viewing FIGS. 1–3, it can be seen that the basic function of back-up tongs 1 is to employ axial jaw member 5 and pivoting jaw members 7 to form a substantially closed perimeter around pipe 2. While the gap seen in FIG. 3 existing between the closed pivoting jaw members 7 may vary, those skilled in the are will recognize that the more complete perimeter formed by the jaw members, the greater the gripping capacity of the power tongs.

Viewing FIG. 1, pivoting jaw members 7 will be mounted on the front section 4 of tong body 3 by way of pins 12 which will act as pivot points 13 for pivoting jaws 7. A first end of pivoting jaw 7 will consist of an arcuate segment 7*a*. Both arcuate segments 7*a* and axial jaw 5 will have a concave surface 35 with grooves 36 milled therein. Correspondingly, a die 15 is provided having a convex surface with splines 37 milled therein. The splines 37 are milled to matingly slide into the grooves 36 so as to hold die 15 in place. The spline and groove combination provides the necessary torque resistance to the high rotational forces generated when assembling or disassembling pipe segments. Die 15 is held vertically in place by any conventional means such as screw 38 and a lip 35 (not shown) which will allow for easy installation and removal of die 15. Die 15 will have a concave wearing surface 16 which corresponds to the radial curvature of the pipe to be gripped. Wearing surface 16 typically will have a plurality of teeth formed thereon to aid in gripping the pipe. Removable dies 15 may vary in size in order to accommodate different diameters of pipe 2. A more detailed description of die 15 is disclosed in U.S. Pat. No. 4,649,777 to Buck, which is incorporated by reference herein.

Still viewing FIG. 1, a second end of pivoting jaws 7 will consist of rolling surface 7*b* which operates in conjunction with axial jaw 5 as explained below. Pivoting jaws 7 will have an apertures 11 located between arcuate segment 7*a* and roller surface 7*b*. The apertures 11 will in turn pivotally engage pins 12 which will be located at pivot points 13.

Axial jaw 5 will be positioned between and generally to the rear of pivot points 13. As mentioned above, axial jaw 5 also has a arcuate die 15 for engaging the pipe 2. Additionally, each side of axial jaw 5 has an inclined cam surface 18 and locking surface 18*a* for engaging rolling surfaces 7*b* of pivoting jaw 7. The operation of inclined cam surface 18 and locking surface 18*a* will be explained in further detail below.

It can be seen from FIGS. 1–3 that axial jaw 5 is integrally attached to piston and cylinder assembly 20. As most clearly seen in FIG. 2, piston and cylinder assembly 20 generally comprise a cylinder body 23 which is formed with axial jaw 5. Engaging cylinder body 23 will be piston rod 22 having a piston head 21. The end of piston rod 22 opposite piston head 21 is connected to piston backplate 24. Piston backplate 24 is secured in tong body 3 such that operation of piston and cylinder assembly 20 causes cylinder body 23 to move relative to tong body 3 rather than piston rod 22 moving relative to tong body 3.

As best seen in FIG. 2, two sealed cavities are formed between the walls of cylinder body 23 and piston head 21. Forward cavity 25 is formed between the face 26 of piston head 21 and the front walls 27 of cylinder body 23. A central passage 28 is formed through piston rod 22 and communicates with forward cavity 25. Behind piston head 21 is a second cavity, rearward cavity 29 formed by the back of piston head 21 and the rearward portions of cylinder body 23. An offset passage 31 also communicates through piston rod 22, offset and separated from central passage 28. Offset passage 31 is in fluid connection with rearward cavity 29. Both central passage 28 and offset passage 31 are connected to a source of hydraulic fluid which is not shown. A more detailed description of hydraulic piston and cylinder assembly 20 is disclosed in U.S. Pat. No. 4,649,777 to Buck, which is incorporated by reference herein.

In operation, the movement of cylinder body 23 (and thus axial jaw 5) is controlled by the selective filling of cavities 25 or 29. To move jaw 5 forward to engage pipe 2, hydraulic fluid is pumped into forward cavity 25, causing cylinder body 23 to move forward relative to tong body 3. To disengage pipe 2, hydraulic fluid is pumped into rearward cavity 29 while fluid is allowed to simultaneously drain from forward cavity 25. Cylinder body 23 moves rearward relative to tong body 3 and pipe 2 is released.

The movement of axial jaw 5 to engage and disengage pipe 2 also operates to cause pivoting jaws 7 to engage and disengage pipe 2. When axial jaw 5 is fully in the rearward position, pivoting jaws 7 are fully open as seen in FIG. 1. As axial jaw 5 moves forward, inclined cam surfaces 18 will begin to engage roller surfaces 7*b* of pivoting jaws 7. As roller surfaces 7*b* are forced outward, pivoting jaw 7 begins to rotate around pivot points 13. This rotational movement then causes arcuate segments 7*a* of pivoting jaws 7 to begin to close on pipe 2 as seen in FIG. 2. As the pivoting jaws 7 completely close on pipe 2, locking surface 18*a* will engage roller surfaces 7*b* and hold pivoting jaws 7 firmly in place as seen in FIG. 3. It can be seen that the simultaneous closing of pivoting jaws 7 and axial jaw 5 will substantially enclose pipe 2.

Figure 6:
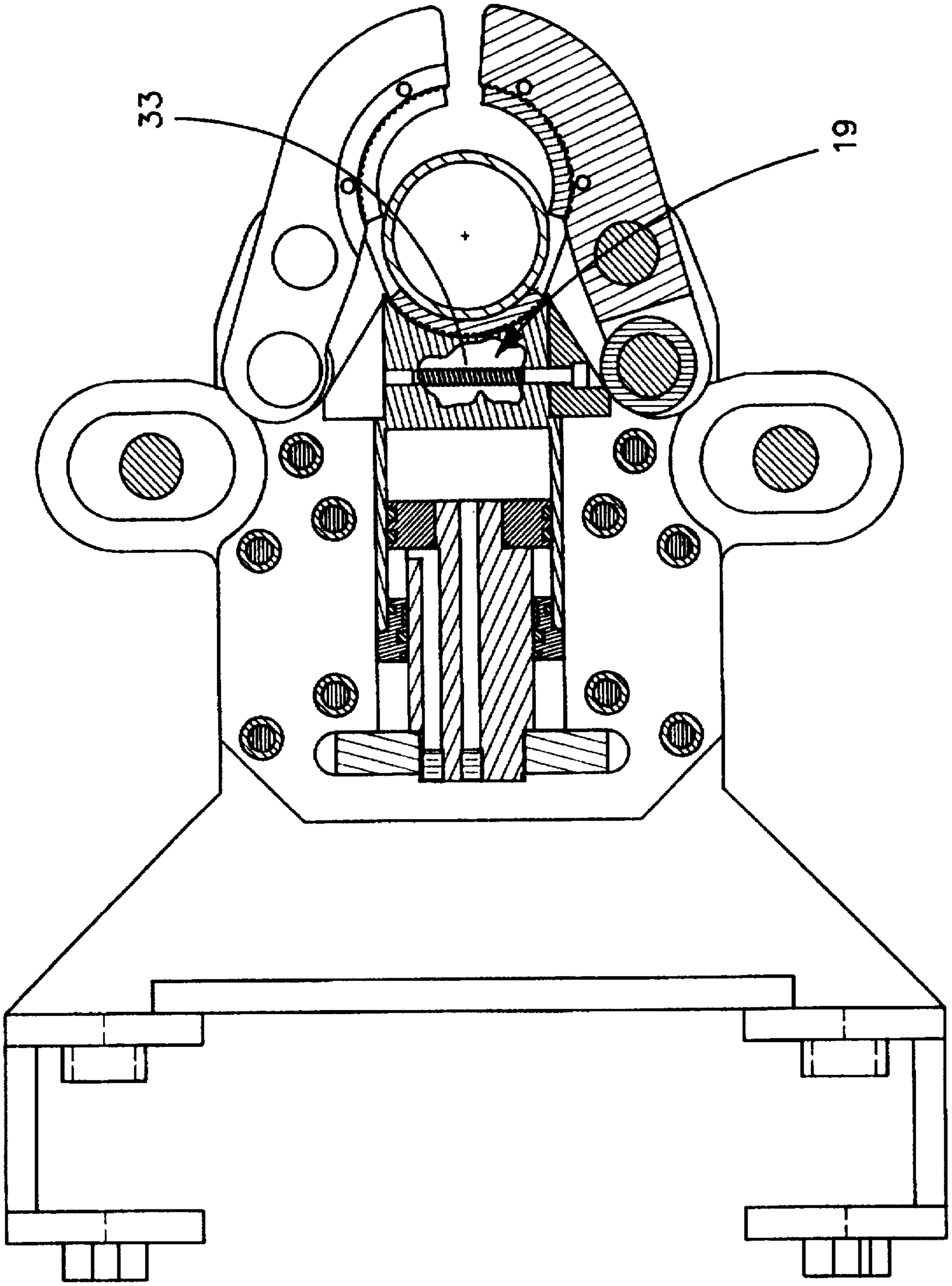
FIG. 6 is a top view of the back-up tongs with the axial jaw partially cut away in order to illustrate the biasing means between the roller surfaces.

To release pipe 2, axial jaw 5 is moved to a rearward position and locking surfaces 18*a* and cam surfaces 18 are removed from engagement with roller surfaces 7*b*. As best seen in FIG. 6 through the cutaway section of jaw 5, biasing device 19 will be connected to and between the two roller surfaces 7*b* in order to bias the roller surfaces 7*b* toward each other when cam surfaces 18 are not engaging roller surfaces 7*b*. While biasing device 19 is positioned beneath axial jaw 5 in the embodiment shown, any manner of connecting biasing device 19 to the cam surfaces 18 may be used as long as cam surfaces 18 are biased together and axial jaw 5 may engage pipe 2. In the embodiment shown, biasing device 19 is a spring 33.

Figure 5:
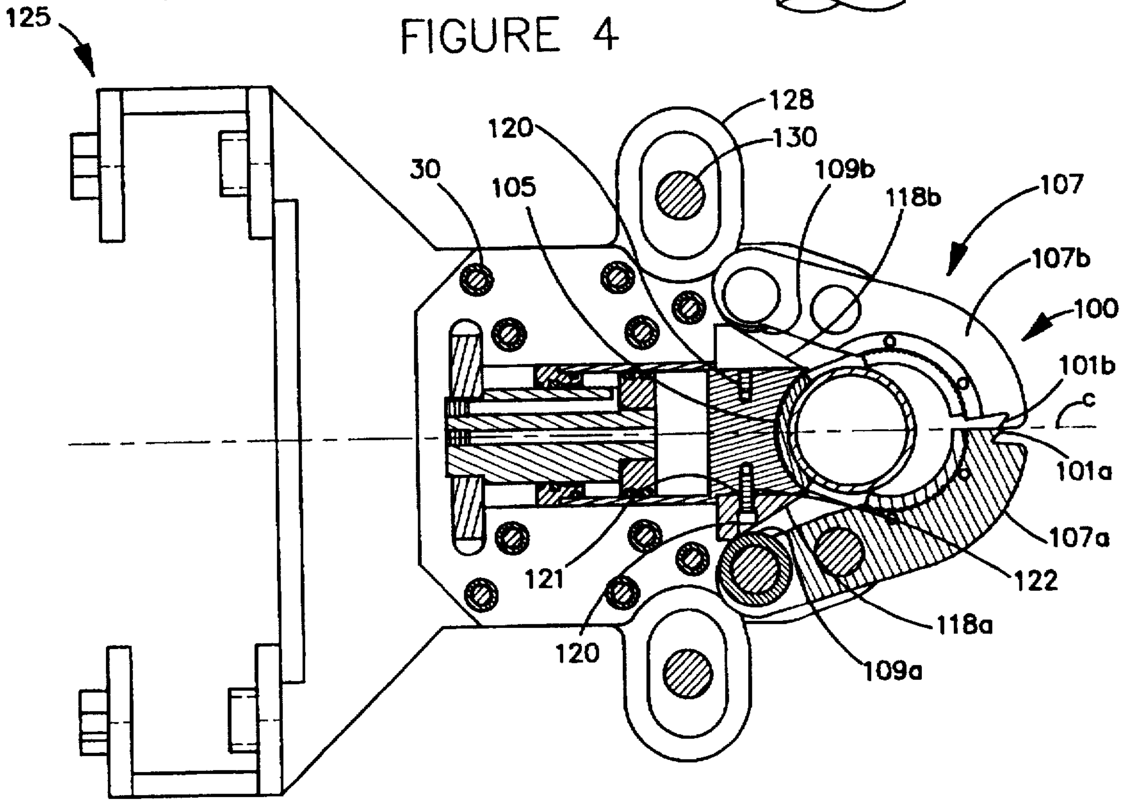
FIG. 5 is a top view of a second embodiment of the back-up power tongs which has interlocking pivoting jaws.

An alternate embodiment of the present invention is shown in FIG. 5. In this embodiment, arcuate jaws 107*a* and 107*b* will have a locking mechanism 100 to securely lock jaws 107*a* and 107*b* together. The locking mechanism shown in the figures is locking hooks 101*a* and 101*b*.

Locking hooks 101*a* and 10l*b* are positioned so as to face in opposing directions from each other so as to lock when arcuate jaws 107*a* and 107*b* are brought together.

In order for locking hooks 101*a* and 10l*b* to matingly engage, locking hook 101*a* must pass center line C prior to locking hook 10l*b* reaching center line C. This is accomplished by having movable cam surface 118*a* engage roller surface 109*a* prior to cam surface 118*b* engaging roller surface 109*b*. As seen in FIG. 5, both cam surfaces 118*a* and 118*b* are connected to axial jaw 105 by bolts 120. However, the side of axial jaw 105 to which movable cam surface 118*a* is attached further has a counter bored recessed area 121 around bolt 120 and a biasing member, such as spring 122, positioned in recessed area 121 and around bolt 120.

In its relaxed position, spring 122 biases movable cam surface 118*a* in an outward direction toward roller surface 109*a*. As described earlier, when the power tongs are to be closed, axial jaw member 105 begins to move forward. Because movable cam surface 118*a* extends outward further that cam surface 118*b*, movable cam surface 118*a* engages roller surface 109*a* prior to cam surface 118*b* engaging roller surface 109*b*. Thus arcuate jaw 107*a* proceeds toward center line C slightly ahead of arcuate jaw 107*b*. As locking hook 101*a* passes center line C, it is in a position slightly lower than locking hook 101*b*, which allows locking hook 101*b* to overlap locking hook 101*a*.

Simultaneously with the overlapping movement of locking hooks 101*a* and 101*b*, axial jaw 105 is causing pipe 2 to move towards arcuate jaws 107. As pipe 2 presses against arcuate jaws 107, locking hooks 101 are urged to matingly engage each other. To properly engage locking hooks 101 in the final locking position, roller surfaces 109 must both be displaced outwardly an equal distance by cam surfaces 118. This is accomplished by spring 122 being compressed and allowing movable cam surface 118*a* to be pushed against axial jaw 105 when the arcuate jaws 107 are completely closed. Thus cam surfaces 118*a* and 118*b* are applying equal closing force to jaws 107*a* and 107*b* respectively. As with the previously described embodiment, the pipe 2 may be released by the rearward movement of axial jaw 105.

Figure 7:
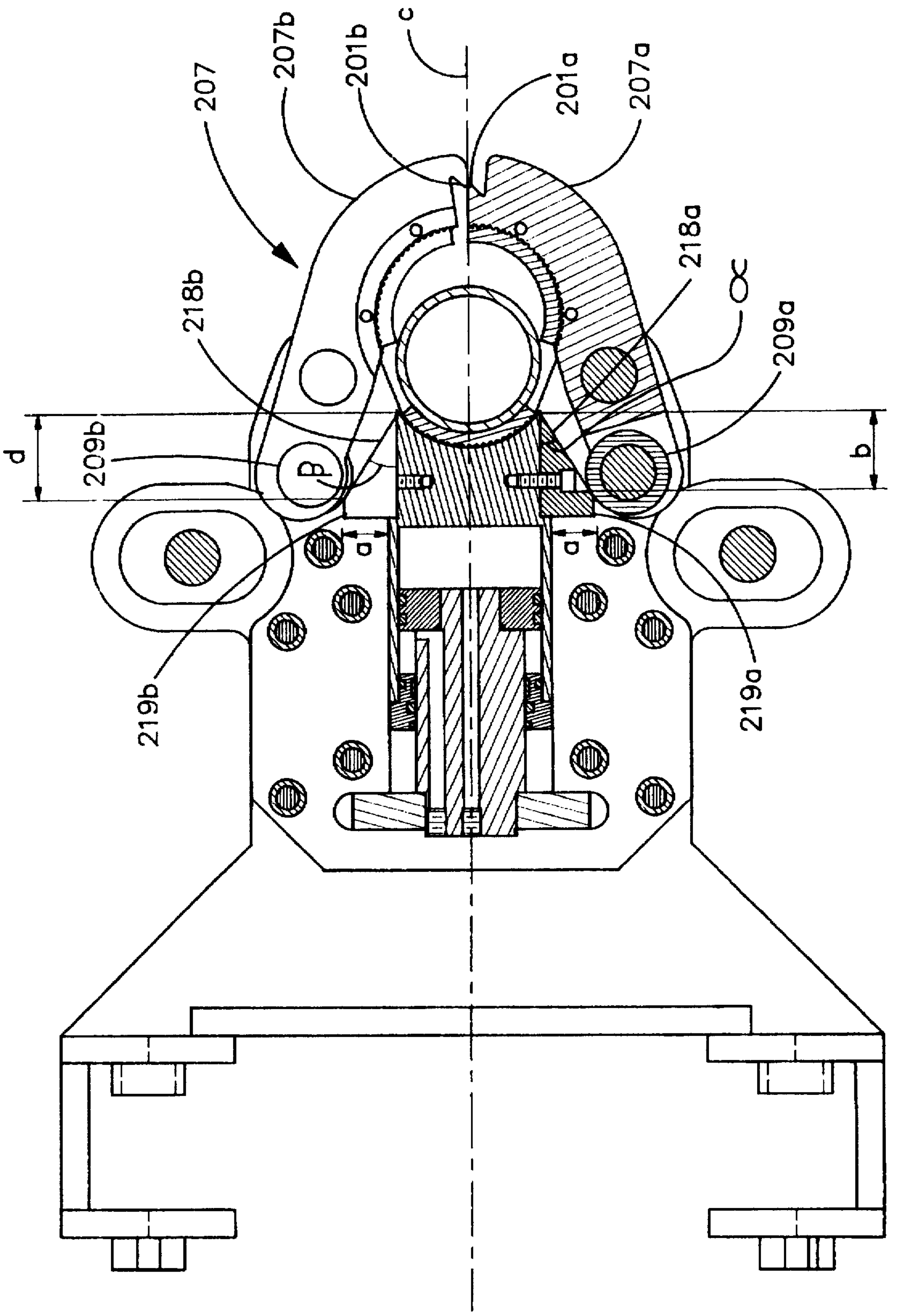
FIG. 7 is a top view of a third embodiment of the back-up power tongs which has cam surfaces with different angle of inclination.

A third embodiment of the invention is seen in FIG. 7. In this embodiment, the cam surfaces 218*a* and 218*b* provide different degrees of inclination as represented by angles $\alpha$ and $\beta$. It will be understood that the height a of both cam surfaces is equal. However, the length b of cam surface 218*a* is less than the length d of cam surface 218*b*. It will be readily apparent that these dimensions dictate that angle $\alpha$ of cam surface 218*a* will be greater than angle $\beta$ of cam surface 218*b*.

The result of this difference in angles $\alpha$ and $\beta$ is that pivoting jaw 207*a* will move toward center line C more quickly than pivoting jaw 207*b*. However, because the height a of cam surface 218*a* is equal to the height a of cam surface 218*b*, neither pivoting jaw will cross center line C to any greater degree than tho other.

Those skilled in the art will recognize that because pivoting jaws 207 are moving in an arcuate path, the travel of locking hooks 201 has both a horizontal and vertical component. Since pivoting jaw 207*a* moves toward center fine C ahead of pivoting jaw 207*b*, locking hook 201*a* will be in a lower position than locking hook 201*b* as both pivoting jaws 207 approach center line C. This allows the farthermost tip of locking hook 201*b* to extend over and engage the farthermost tip of locking hook 201*a* as pivoting jaws 207 close on center line C. At this point, roller surfaces 209 have engaged locking surfaces 219 and there will be no further pivoting motion by pivoting jaws 207. However, the pressure of pipe 2 moving against pivoting jaws 207 will typically cause some further engagement of locking hooks 201 as materials undergo the normal strain caused by the large forces associated with gripping pipe 2.

Those skilled in the art will readily see the many advantages presented in these latter two embodiments. In the first embodiment, all forces tending to spread the arcuate jaws 7*a* had to be born by the roller surfaces 7*b* acting against cam surface 18. To the contrary, in the last two embodiments just described, locking hooks 101 and 201 bear the majority of the spreading forces acting on arcuate jaws 107 and 207 and thereby provide a considerably stronger tool.

Figure 8:
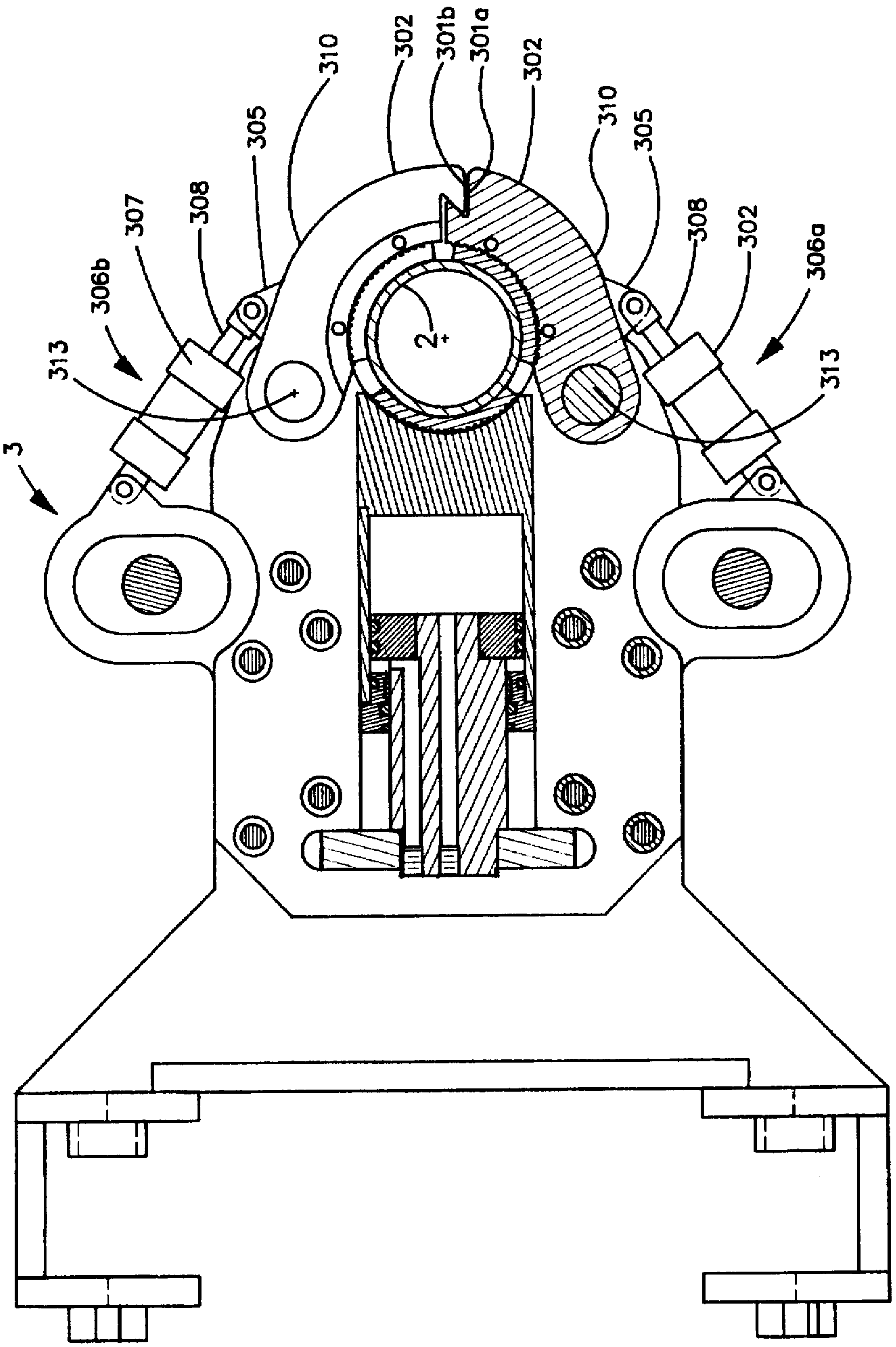
FIG. 8 is a top view of a fourth embodiment of the back-up power tongs which has linear actuators closing the pivoting jaws.

A fourth embodiment can be seen in FIG. 8. This embodiment operates on a somewhat different principle than the previously discussed embodiments. In FIG. 8, the pivoting jaws 302 are closed by the operation of linear actuators such as hydraulic piston assemblies 306*a* and 306*b*. While the linear actuators shown are hydraulic piston assemblies, the linear actuators could be any other device, such as powers screws, that will impose a linear force on pivoting jaws 302.

Each of the pivoting jaws 302 will have an external surface 310 and a bracket 305 attached to external surface 310. The hydraulic rams 308 of hydraulic piston assemblies 306*a* and 306*b* will be pivotally attached to brackets 305. The hydraulic cylinders 307 of hydraulic piston assemblies 306*a* and 306*b* will be attached to the tong body 3.

In operation, the piston assemblies 306*a* and 306*b* will exert a linear force on pivoting jaws 302. Because the brackets 305 provide a pivotal connection, the linear force causes pivoting jaws 302 to rotate on pivot points 313 and to close the jaws as illustrated in the previous embodiments. Also as shown in the previous embodiments, it is necessary that locking hook 301*a* move into a closed position slightly ahead of locking hook 301*b*. This may be accomplished by causing piston assembly 306*a* to extend ram 308 at a faster rate than piston assembly 306*b* or by causing piston assembly 306*a* to begin extending ram 308 at an earlier point in time than piston assembly 306*b* begin to extend ram 308. Either of these methods may be accomplished by any conventional means for controlling the relative flow of hydraulic fluid into piston assemblies 306*a* and 306*b*.

While many parts of the present invention have been described in terms of specific embodiments, it is anticipated that still further alterations and modifications thereof will no doubt become apparent to those skilled in the art. It is therefore intended that the following claims be interpreted as covering all such alterations and modifications as fall within the true spirit and scope of the invention.

I claim:

1. A system for making up or breaking apart a threaded joint on a tubular member comprising:
   - a. a power tong gripping a first section of said tubular member on one side of said threaded joint in order to apply torque to said first section; and
   - b. a back-up tong gripping a second section of said tubular member on an opposite side of said threaded joint in order to hold said second section against rotation, said back-up tong comprising:
     - i. a body having a front end formed by first and second pivoting jaws which both grip said tubular member when in the closed position;
     - ii. a linear actuator attached between said body and said first and second pivoting jaws which provides a closing force on the tubular member; and
     - iii. a third jaw positioned on said body such that said first and second pivoting jaws and said third jaw substantially enclose the tubular member such that said closing force of said linear actuators is sufficient to prevent rotation of the tubular member about a longitudinal axis of the tubular member.

2. A power tong system according to claim 1, wherein said pivoting jaws are attached to a pivot point on said body and said linear actuators are attached to said pivoting jaws forward of said pivot point.

3. The power tong system of claim 1, wherein said back-up tong closes said pivoting jaws in a predetermined sequence.

4. The power tong system according to claim 1, wherein said jaws have a concave surface including a plurality of parallel cog-shaped splines radially spaced over said concave surface, forming parallel cog-shaped grooves between said splines, each of said splines extending outward substantially perpendicular from said concave surface.

5. The power tong system according to claim 1, wherein said linear actuator attached to said first pivoting jaw is adapted to move said first pivoting jaw to a closed position before said second pivoting jaw reaches a closed position.

6. The power tong system according to claim 1, wherein said linear actuators are cylinder and piston assemblies having a first and second end, said first end being attached to a pivoting jaw and said second end being attached to said body.

7. The power tong system according to claim 1, wherein said pivoting jaws have a locking mechanism attached thereto.

8. The power tong system according to claim 7, wherein said locking mechanism comprises locking hooks attached to said pivoting jaws.

9. The power tong system according to claim 1, wherein said third jaw is an axial jaw moving in an axial path to engage the tubular member.

10. A system for making up or breaking apart a threaded joint on a tubular member comprising:

a. a power tong gripping a first section of said tubular member on one side of said threaded joint in order to apply torque to said first section, and b. a back-up tong gripping a second section of said tubular member on an opposite side of said threaded joint in order to hold said second section against rotation, said back-up tong comprising:

i. a body having a from end with a width and first and second pivoting jaws, said width not being substantially greater than that needed to accommodate said pivoting jaws when in an open position;

ii. a linear actuator attached between said body and said first and second pivoting jaws which provides a closing force on the tubular member; and ii. a third jaw positioned on said body such that said first and second pivoting jaws and said third jaw substantially enclose the tubular member such that said closing force of said linear actuators is sufficient to prevent rotation of the tubular member about a longitudinal axis of the tubular member.

11. The power tong system of claim 10, wherein said back-up tong closes said pivoting jaws in a predetermined sequence.

12. The power tong system according to claim 10, wherein said jaws have a concave surface including a plurality of parallel cog-shaped splines radially spaced over said concave surface, forming parallel cog-shaped grooves between said splines, each of said splines extending outward substantially perpendicular from said concave surface.

13. The power tong system according to claim 10 wherein said linear actuator attached to said first pivoting jaw is adapted to move said first pivoting jaw to a closed position before said second pivoting jaw reaches a closed position.

14. The power tong system according to claim 10, wherein said pivoting jaws have a locking mechanism attached thereto.

15. A power tong system according to claim 10, wherein said pivoting jaws are attached to a pivot point on said body and said linear actuators are attached to said pivoting jaws forward of said pivot point.

16. A system for making up or breaking apart a threaded joint on a tubular member comprising:

a. a power tong gripping a first section of said tubular member on one side of said threaded joint in order to apply torque to said first section; and b. a back-up tong gripping a second section of said tubular member on an opposite side of said threaded joint in order to hold said second section against rotation, said back-up tong comprising:

i. a body section;

ii. two pivot points fixed to said body section such that said pivot points may not rotate with respect to said body section;

iii. a pivoting jaw fixed to each of said pivot points, wherein both of said pivoting jaws are adapted to grip the tubular member to prevent rotation of the tubular member about a longitudinal axis of the tubular member;

iv. a linear actuator attached between said body and each of said pivoting jaws which provides a closing force on the tubular member; and v. a third jaw positioned on said body such that said pivoting jaws and said third jaw substantially enclose the tubular member such that said closing force of said linear actuators is sufficient to prevent rotation of the tubular member about a longitudinal axis of the tubular member.

17. The power tong system of claim 16, wherein said back-up tong closes said pivoting jaws in a predetermined sequence.

18. The power tong system according to claim 16 wherein said linear actuator attached to said first pivoting jaw is adapted to move said first pivoting jaw to a closed position before said second pivoting jaw reaches a closed position.

19. The power tong system according to claim 16, wherein said pivoting jaws have a locking mechanism attached thereto.

20. A power tong system according to claim 16, wherein said pivoting jaws are attached to a pivot point on said body and said linear actuators are attached to said pivoting jaws forward of said pivot point.

* * * * *